July 11, 1950   D. W. HUTCHINSON   2,514,393
VARIABLE AREA EXHAUST NOZZLE FOR POWER PLANTS
Filed Sept. 3, 1947
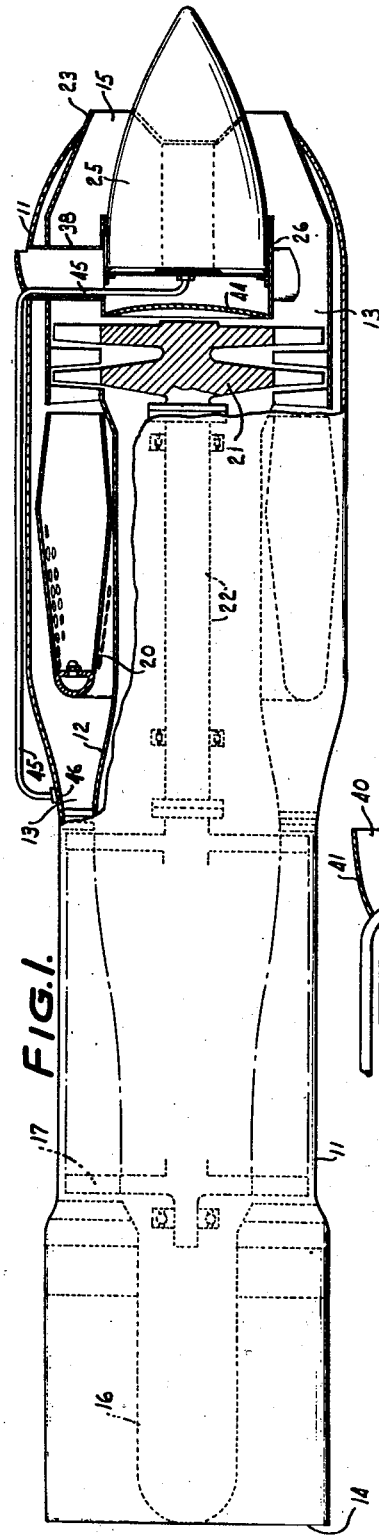
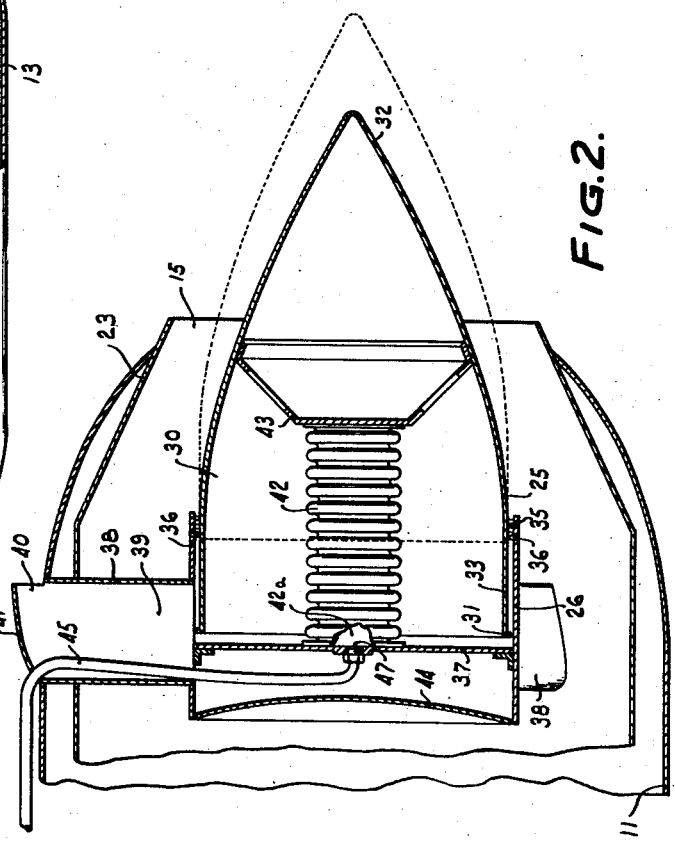
INVENTOR
DAVID W. HUTCHINSON
BY
ATTORNEY Patented July 11, 1950

2,514,393

UNITED STATES PATENT OFFICE 2,514,393

VARIABLE AREA EXHAUST NOZZLE FOR POWER PLANTS

David W. Hutchinson, Mamaroneck, N. Y., assignor to Westinghouse Electric Corporation, East Pittsburgh, Pa., a corporation of Pennsylvania Application September 3, 1947, Serial No. 771,920

3 Claims. (Cl. 60—35.6)

This invention relates to power plant apparatus having a nozzle through which exhaust or motive fluid is discharged, and more particularly to a power plant having an adjustable nozzle for governing operational characteristics thereof.

In the development of the gas turbine engine, particularly the turbo-jet engine for aircraft, it has been proposed to equip the turbine exhaust nozzle with means for varying the flow characteristics of the jet in accordance with operating conditions, in order to conserve fuel and promote maximum efficiency. Such variable flow nozzles have usually taken the form of adjustable nozzle elements which must be secured in the selected position prior to starting of the engine, or of mechanism adapted to be operated manually by the pilot in flight. I propose to effect automatic control of a gas turbine exhaust nozzle by employing relatively simple fluid pressure actuating means adapted to respond to variations in fluid pressure reflecting operative conditions of the power plant while in service.

It is therefore an object of the present invention to provide an improved automatically adjustable nozzle apparatus for a gas turbine power plant.

Another object of the invention is the provision of means for automatically varying the flow area of an exhaust nozzle to obtain the best possible performance of a turbo-jet engine through a wide range of operating conditions.

A further object of the invention is to provide inexpensive means for varying the flow area of an exhaust nozzle in accordance with engine operating conditions, including lightweight mechanism adapted to be contained entirely within the tail assembly, and involving features of construction tending to minimize the burdens of maintenance and repair.

These and other objects are effected by the invention as will be apparent from the following description and claims taken in connection with the accompanying drawing, forming a part of this application, in which:

Fig. 1 is a schematic elevational view, partly in section, of a gas turbine power plant having a nozzle assembly constructed in accordance with the invention; and Fig. 2 is an enlarged detail, sectional view of the nozzle assembly of the apparatus shown in Fig. 1.

Referring to Fig. 1 of the drawing, the gas turbine engine therein illustrated in schematic form is one of a type adapted to be equipped with a tail or nozzle assembly embodying features of the invention, and includes a streamlined cylindrical outer casing structure 11 which may be mounted in the fuselage or wings of an aircraft, for compactly housing operating elements that are arranged in line to present minimum frontal area and drag during operation of the plane at high speed. Supported within the casing structure 11 is an inner casing structure 12 forming an annular passageway 13, which provides a flow communication that extends longitudinally through the engine from a forwardly directed air intake opening 14 to a rearwardly disposed jet or discharge nozzle 15. Mounted in the casing structure 11—12 along the axis thereof are a fairing section 16 which may contain auxiliary control apparatus (not shown), a multiple stage axial-flow compressor 17, fuel combustion apparatus 20, and a turbine 21. The turbine 21 is operatively connected to the rotor of the compressor 17 by means of an axially mounted shaft 22 which is suitably journaled within the casing structure 12. The nozzle 15 is disposed rearwardly of the turbine 21 and has an annular flow area defined by a tapered section 23 of the casing structure 11 and a core or tailpiece 25, which is operatively mounted on a terminal section 26 of the inner casing structure 12, as hereinafter more fully explained.

In operation, air entering the intake opening 14 is compressed by the compressor 17 and supplied by way of the passageway 13 to the combustion apparatus 20, to support combustion of fuel therein while at the same time blanketing and protecting adjacent surfaces of the power plant from the resulting high temperatures. Hot motive fluid issuing from the combustion apparatus 20 is then expanded through the turbine 21 and finally discharged through the nozzle 15 in the form of a jet establishing a propulsive thrust.

According to the invention, as best shown in Fig. 2, the movable tailpiece 25 is made in the form of a tapered hollow core section having an inner chamber 30, the forward end of the section having formed thereon an annular flange 31 and the rear end terminating in a generally conical surface 32. A cylindrical portion 33 adjacent the flange 31 of the tailpiece 25 is slidably mounted within an annular sealing member 35 carried by the section 26 of the inner casing structure, so that the tailpiece 25 is thus adapted to be moved relative to the stationary section 26 from a normal inner position to an outer position indicated in dotted lines in Fig. 2. Suitable motion-limiting means or stops 36 may be secured to the stationary section 26 for engagement with flange 31 to limit outward movement of the tailpiece 25, the movement thereof in the opposite direction being limited upon engagement of the flange 31 with a wall 37 welded or otherwise secured within the casing section 26.

In accordance with well known practice, the inner casing section 26 is supported within the outer casing structure 11 through the medium of suitably disposed radial struts, including a hollow strut 38 which extends from the casing section 26 to the outer casing structure 11. As best shown in Fig. 2 of the drawing, the hollow strut 38 has a passageway 39 which communicates with the chamber 30 in the tailpiece 25 and with an atmospheric exhaust opening 40 formed in a rearwardly directed hood 41, which is mounted on the outer surface of the casing structure 11. The forward end of the casing section 26 is closed by a wall 44.

Mounted within the chamber 30 is an axially disposed collapsible bellows diaphragm 42, one end of which is closed and secured by means of a bracket 43 carried by the tailpiece 25, and the opposite end of which is secured and sealed to the wall 37. For supplying fluid under pressure to the diaphragm 42 for actuating the tailpiece 25, there is provided a conduit or pipe 45, the forward end of which communicates by way of a port 46 formed in the casing structure 11 with one of the stages of the axial-flow compressor 17, and the opposite end of which extends through the hollow strut 38 and communicates by way of a port 47 in the wall 37 with the chamber 42a within the bellows diaphragm 42.

It will now be apparent that when the gas turbine power plant is operated as already explained, the tailpiece 25 will be subject to the opposing pressures of exhaust fluid flowing through the nozzle 15 and fluid within the inner chamber 30, which is constantly maintained at a low pressure due to evacuation of air therefrom by way of the passage 39 and atmospheric port 40. At the same time, the bellows diaphragm 42 is subject to the pressure of air supplied thereto from the compressor 17 by way of the conduit 45, in opposition to the fluid pressure within chamber 30 acting on the outer surface of the diaphragm. When the engine speed is relatively low, the fluid pressure within chamber 42a corresponding to the output of the compressor 17 is likewise at a reduced value, so that the pressure of exhausted motive fluid flowing through the nozzle 15 is permitted to maintain the tailpiece 25 in its normal or forward position, as shown in the drawing, thereby establishing a maximum flow area in the nozzle.

Upon an increase in the rotational speed of the engine, however, the pressure of fluid supplied to the chamber 42a within the bellows diaphragm 42 is accordingly increased due to the higher speed of operation of the compressor 17, with the result that the bellows diaphragm 42 is expanded to exert force on the tailpiece 25 in the direction of flow of fluid through the nozzle 15. With the pressure area of the bellows diaphragm 42 properly proportioned to the pressure area of the tailpiece 25, such an increase in the pressure of fluid delivered by the compressor 17 becomes effective to shift the tailpiece 25 rearwardly toward the outermost position as indicated in dotted lines in Fig. 2, in opposition to the pressure of exhaust fluid acting on the outer surface of the tailpiece. The magnitude of this latter force, i. e., the exhaust pressure within the nozzle 15, tends to increase with an increase in the engine speed and with the reduction in flow area of the nozzle. Consequently, as the tailpiece 25 is moved rearwardly due to the rise in pressure within the bellows diaphragm 42, the opposing exhaust pressure within nozzle 15 will finally act on the outer surface of the tailpiece 25 with sufficient force to prevent further movement thereof.

Similarly, upon a reduction in engine speed, the reduction in fluid pressure within the bellows diaphragm 42 as determined by the speed of the compressor 17 will enable reverse or forward movement of the tailpiece 25 under the pressure of fluid flowing through the nozzle, until the opposing forces acting on the tailpiece again reach a point of equilibrium.

It will thus be seen that the flow area of the exhaust nozzle 15 is automatically determined by the variations in the pressure of fluid delivered by the compressor 17, as well as by the pressure of the turbine exhaust. If desired, the fluid pressure mechanism for controlling the movement of the adjustable tailpiece might be controlled by variations in pressure of fluid bled from other regions of the compressor 17 or from the diffuser or turbine discharge. The chamber 30 within the tailpiece 25 could likewise be vented in another suitable manner, as by means of a connection leading to the compressor inlet, or to the jet at the tip of the tailpiece.

From the foregoing, the advantages of simplicity of construction, light weight and relatively low cost assembly inherent in my improved turbo-jet nozzle governing apparatus will be readily apparent. Since the improved mechanism may be wholly contained within the tail assembly without requiring addition of complicated or delicate control devices increasing the maintenance burden, existing power plants as well as newly developed equipments may be easily equipped with the apparatus. The invention may also be utilized in other types of thermo-jet propulsion power plants than the specific apparatus herein disclosed.

While the invention has been shown in but one form, it will be obvious to those skilled in the art that it is not so limited, but is susceptible of various changes and modifications without departing from the spirit thereof.

What is claimed is:

1. In a gas turbine power plant including fuel combustion means, a gas turbine operative by motive fluid therefrom, and a compressor driven by said turbine to supply air under pressure to said combustion means, the combination of casing structure forming an exhaust nozzle for said turbine, movable tailpiece means operable to vary flow characteristics of said nozzle, said tailpiece means being urged toward open position by the thrust of gases at said nozzle, and fluid pressure responsive mechanism for actuating said tailpiece means toward closed position, and mechanism including a movable abutment subject on one side only to pressure of air in a control chamber connected through an always open communication to said compressor, whereby when the output of said fuel combustion means is increased, said turbine and said compressor will develop increased speed prior to a closing movement of said tailpiece means to avoid any tendency of the compressor to stall.

2. In a gas turbine power plant comprising a compressor, combustion apparatus, and a turbine operative to drive the compressor and to discharge motive fluid downstream through an annular nozzle; an axially disposed tail cone movably mounted in said nozzle and movable in a downstream direction for reducing the flow area thereof, said tail cone being movable in the upstream direction by the force of motive fluid flowing through said nozzle, a bellows diaphragm having a chamber on its upstream side and having its downstream side operatively connected to said cone, and an always open communication connected only to said chamber at the upstream side of said bellows through which said bellows is subjected to the pressure of air compressed by said compressor in a direction tending to move said cone toward its minimum area position, so that said tail cone is automatically positioned according to variations in the force of said diaphragm and in the opposing thrust of said nozzle.

3. In a gas turbine power plant comprising a compressor, combustion apparatus, and a turbine operative to drive the compressor and to discharge motive fluid downstream through an annular nozzle; a tail cone movable in the downstream direction to reduce the discharge area of the exhaust nozzle, and a movable abutment connected to said cone and having a chamber upstream thereof always connected to said compressor, said abutment being responsive to pressure of air delivered by the compressor to move said tail cone in a downstream direction to decrease the discharge area with increase in velocity and thrust of the motive fluid, until the thrust of said tail cone produced by increase in velocity balances the force of increase in compressor discharge pressure acting on said tail cone.

DAVID W. HUTCHINSON.

REFERENCES CITED

The following references are of record in the file of this patent:

UNITED STATES PATENTS

| Number | Name | Date |
|---|---|---|
| 2,402,363 | Bradbury | June 18, 1946 |
| 2,405,723 | Way | Aug. 13, 1946 |
| 2,411,895 | Poole | Dec. 3, 1946 |

FOREIGN PATENTS

| Number | Country | Date |
|---|---|---|
| 587,558 | Great Britain | May 7, 1947 |
| 295,515 | Germany | July 30, 1917 |

Certificate of Correction

July 11, 1950

Patent No. 2,514,393     DAVID W. HUTCHINSON

It is hereby certified that error appears in the printed specification of the above numbered patent requiring correction as follows:

Column 4, line 61, for the word "and" read *said*;

and that the said Letters Patent should be read as corrected above, so that the same may conform to the record of the case in the Patent Office.

Signed and sealed this 17th day of October, A. D. 1950.

[SEAL]

THOMAS F. MURPHY,
*Assistant Commissioner of Patents.*